(12) United States Patent
Hong et al.

(10) Patent No.: US 7,577,902 B2
(45) Date of Patent: Aug. 18, 2009

(54) SYSTEMS AND METHODS FOR ANNOTATING PAGES OF A 3D ELECTRONIC DOCUMENT

(75) Inventors: Lichan Hong, Mountain View, CA (US); Stuart K Card, Los Altos, CA (US); Ed H Chi, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 609 days.

(21) Appl. No.: 11/012,902

(22) Filed: Dec. 16, 2004

(65) Prior Publication Data

US 2006/0136813 A1 Jun. 22, 2006

(51) Int. Cl.
G06F 17/00 (2006.01)
(52) U.S. Cl. ............... 715/232; 715/230; 715/231; 715/233; 345/629; 345/633; 345/619
(58) Field of Classification Search ......... 715/230–233; 345/629, 633
See application file for complete search history.

(56) References Cited

U.S. PATENT DOCUMENTS

| 5,923,324 | A * | 7/1999 | Berry et al. | 715/852 |
|---|---|---|---|---|
| 6,340,980 | B1 | 1/2002 | Ho | |
| 7,148,905 | B2 * | 12/2006 | Hong et al. | 345/629 |
| 2002/0031756 | A1 * | 3/2002 | Holtz et al. | 434/362 |
| 2002/0035697 | A1 | 3/2002 | McCurdy et al. | |
| 2002/0113823 | A1 * | 8/2002 | Card et al. | 345/776 |
| 2003/0013073 | A1 | 1/2003 | Duncan et al. | |

2004/0205545 A1 10/2004 Bargeron et al.

FOREIGN PATENT DOCUMENTS

| EP | 0 822 501 A2 | 2/1998 |
|---|---|---|
| WO | WO 97/22109 | 6/1997 |
| WO | WO 01/42980 A1 | 6/2001 |
| WO | WO 02/01339 A1 | 1/2002 |

OTHER PUBLICATIONS

Jung, Thomas et al., Annotating and Sketching on 3D Web models, ACM Jan. 2002, pp. 1-8.*
U.S. Appl. No. 10/739,175, filed Dec. 2003, Hong et al.

(Continued)

*Primary Examiner*—Stephen S Hong
*Assistant Examiner*—David Faber
(74) *Attorney, Agent, or Firm*—Oliff & Berridge, PLC

(57) ABSTRACT

To annotate a three-dimensional electronic object, e.g., document, a user specifies, on a two-dimensional screen, a portion of a page of a three-dimensional document as a specified page area to be annotated by making a stroke. The annotation may be displayed to the user by a hybrid technique where the annotation is displayed by a 3D polyline segment placed behind the near clipping plane of a virtual camera frustrum. At the same time, previous annotations are displayed by another technique, such as, for example, the texture coloring technique. During the intermittent time between the stroke and another stroke the 3D polyline segment is removed from behind the near clipping plane and the page texture is updated with the annotation data. The display techniques support highlighting annotations, free-form annotations, and text annotations.

20 Claims, 12 Drawing Sheets

OTHER PUBLICATIONS

U.S. Appl. No. 10/739,213, filed Dec. 2003, Hong et al.
Zinio.com — Same Magazines. New Experience; http://web.archive.org/web/20020527231503/http://www.zinio.com/, Dec. 22, 2003, 2 pages.
Pat Hanrahan & Paul Haeberli, "Direct WYSIWYG Painting and Texturing on 3D Shapes," Aug. 1990, Computer Graphics, vol. 24, No. 4, pp. 215-223.
Catherine C. Marshall, "Annotation: from paper books to the digital library". Proceedings of 1997 ACM Digital Library, pp. 131-140.
Bill N. Schilit, Gene Golovchinsky, Morgan N. Price, "Beyond Paper: Supporting Active Reading with Free Form Digital Ink Annotations." Proceedings of CHI 98, pp. 249-256; (pp. 1-8).
Bill N. Schilit, Morgan N. Price, Gene Golovchinsky, "Digital Library Information Appliances" in Proceedings of Digital Libraries '98—Third ACM Conference on Digital Libraries, Pittsburgh, PA, Jun. 23-26, 1998, pp. 217-226.
Beverly L. Harrison, "E-Books and the Future of Reading" IEEE Computer Graphics and Applications—May/Jun. 2000, pp. 32-39.
FlipBrowser; http://web.archive.org/web/20001018000231/www.flipbrowser.com/home.php, Dec. 22, 2003.
Wayback Machine; http//web.archive.org/web/*/http:/www.newsstand.com; Nov. 23, 2004.
CHI 2004, 4 pages, Apr. 24-29, 2004.
Bill N. Schilit; "Beyond Paper: Supporting Active Reading With Free Form Digital Ink Annotations"; pp. 249-256; Palo Alto, CA.
J. Cross C. Baber et al.; "Layered Annotations of Digital Images for Data Collection in the Field"; 2003; United Kingdom.
David Bourguignon; "Drawing for Illustration and Annotation in 3D"; vol. 20, No. 3 (2001); France.
Lichan Hong et al.; "Annotating 3D Electronic Books"; Apr. 2005; pp. 1463-1466; Palo Alto, CA.

* cited by examiner

SYSTEMS AND METHODS FOR ANNOTATING PAGES OF A 3D ELECTRONIC DOCUMENT

BACKGROUND

The entire disclosure of co-pending U.S. patent application Ser. No. 10/739,213 is incorporated herein by reference in its entirety.

Page annotation of documents including books, magazines, journals, textbooks, photo albums, maps, periodicals, or the like, is a common technique performed by readers and viewers of these documents. Page annotation is highly desirable to the readers and the viewers because it provides the readers and the viewers with the ability to mark the documents with text notes, handwritten notes, bookmarks, highlights and/or the like, to, e.g., facilitate later review of the same material by the annotater or another reader.

Although many of these documents have been traditionally presented in paper format, electronic formats of these documents have become widely available due to numerous developments in the computer related fields, e.g., the Internet. With the increasing growth of electronic documents, the readers and the viewers still find page annotation highly desirable. Therefore, some annotation tools for two-dimensional electronic documents have been provided.

For example, Schilit, Price, and Golovchinsky describe a research prototype called XLibris® used to display two-dimensional electronic document pages and support free-form annotations, which runs on a tablet computer and accepts pen input. By using the pen, the user can scribble notes, draw figures, and highlight text. The user also has the option of changing the color of the pen and/or selecting between a wide pen and a narrow pen.

PCT Publication WO 0,142,980 describes an annotation tool for annotating two-dimensional electronic documents. PCT Publication WO 0,142,980 describes that "the annotations are stored separately from the viewed document pages but are correlated with the pages such that when a previously annotated page is revisited, annotations related to that page are retrieved and displayed on top of the page as an 'ink' layer." By using the stylus, the user can highlight certain parts of the two-dimensional document in translucent colors or mark opaque annotations on the page, in a way very similar to XLibris. To display the annotations, the "pixel blending function blends pixels from a document page with corresponding pixels from an annotation or 'ink' layer mapped to that document page, and generates a blended pixel image that is displayed as an annotated document page."

PCT Publication No. WO 0,201,339 also describes an annotation tool for annotating two-dimensional electronic documents, and describes a technique which "analyzes the ink for each annotated pixel and renders the color and brightness of each pixel based on the original pixel color and the added annotation color so as to appear as physical ink would typically appear if similarly applied to physical paper."

SUMMARY

Although using two-dimensional electronic annotation tools in three-dimensional electronic documents is conceivable, visualization and technical implementation problems result when the annotation tools created for the two-dimensional electronic documents are applied to three-dimensional electronic documents. Zinio Reader®, developed by Zinio Systems Inc., located at http://www.zinio.com, and Adobe Acrobat® are two examples of annotation tools.

Adobe Acrobat® includes one example of a two-dimensional electronic annotation tool that allows selected portions of the electronic document to be highlighted. However, if the two-dimensional electronic highlighter annotation tool is applied to a three-dimensional electronic document, then difficulty in defining the highlight area and the visualization of the highlighting ink is presented.

For example, to capture and display pen-based annotations in three-dimensions is different from capturing and displaying pen-based annotations in two-dimensions. Specifically, in two-dimensions, translation of the user input from the computer screen to the page and updating the appearance of the page is relatively straightforward. On the other hand, in three dimensions, three-dimensional transformations must be employed to determine where on the page the user wants to place an annotation and the three-dimensional parameters of the page must be modified in order to show the annotation in the rendered image. Therefore, it is desirable to create annotation tools specifically designed to annotate three-dimensional electronic documents.

For example, Hanrahan and Haeberli describe a three-dimensional electronic paint program that uses a technique to paint surfaces of three-dimensional electronic objects in "Direct WYSIWYG Painting and Texturing on 3D Shapes," Proceedings of the ACM SIGGRAPH'90 Conference, pages 215-223. Based on what is displayed on the computer screen, the user manipulates the parameters, e.g., diffuse color, specular color, and surface roughness, used to shade the surfaces of the three-dimensional object. The paint brush strokes specified by the user are transformed from the screen space to the texture space of the object to update the texture data. As a result, the appearance of the 3D surfaces is modified.

It would therefore be desirable to implement annotation tools in three-dimensional electronic objects that better simulate annotation of actual physical objects, e.g., documents, such as magazines, journals, textbooks, photo albums, maps, periodicals, or the like.

Exemplary embodiments provide systems and methods that allow pages of three-dimensional electronic documents to be annotated in a manner that more accurately simulate annotating pages of an actual physical three-dimensional document.

Exemplary embodiments provide systems and methods that allow pages of three-dimensional electronic documents to be annotated without producing noticeable artifacts.

Exemplary embodiments provide systems and methods that provide a framework to support highlighting annotations, free-form annotations, text annotations and/or the like on one or more pages.

Exemplary embodiments provide systems and methods that allow the user to annotate, e.g., highlight, a figure, a table, multiple lines of text and/or the like on one or more pages.

Exemplary embodiments provide systems and methods that allow the reader or viewer to specify an area as the annotated area.

Exemplary embodiments provide systems and methods that transform an annotated area from the coordinate system of the computer screen to the local coordinate system of the page, whereupon the annotated area is transformed from the local coordinate system of the page to a coordinate system of a texture corresponding to the page, and the resulting coordinates are stored as part of the annotation data.

Exemplary embodiments provide systems and methods that use annotation data to display annotations on the page as the annotated area is gradually defined, and to recreate the annotation from the stored annotation data.

Exemplary embodiments provide systems and methods that superimpose or place one or more transparent polylines over the page area which is to be annotated.

Exemplary embodiments provide systems and methods that superimpose or place one or more transparent geometric shapes, e.g., polygons or polylines over the page area which is to be annotated.

Exemplary embodiments provide systems and methods that re-evaluate the color of vertices as a function of vertex color, annotation color and/or ink density.

Exemplary embodiments provide systems and methods that modify a texture pasted on a page geometry.

Exemplary embodiments provide systems and methods that generate a new page texture based on the original page texture, annotation color and ink density.

In exemplary embodiments, a reader, viewer, annotater, or user can annotate more than one portion of a page and/or more than one page of the three-dimensional document without turning the page.

In exemplary embodiments, the annotation tools for three-dimensional electronic documents simulate user interaction with an actual physical three-dimensional document, e.g., a physical book, by providing users with the ability to annotate the three-dimensional electronic document in an intuitive manner. In exemplary embodiments, there are multiple stages in producing an annotation. The stages include, but are not limited to, the specifying stage and the displaying stage. In the specifying stage, the user decides where to place an annotation and what annotation, e.g., a red highlight, a blue arrow or a free-form line stroke, to place on the electronic document. In the displaying stage, the annotation system displays the annotation in a visual format based on the data captured during the specifying stage.

In exemplary embodiments, an annotation instrument, such as a mouse or stylus, is used as an electronic annotation tool to annotate the three-dimensional electronic document. In exemplary embodiments, a user defines a page area of the three-dimensional electronic document to be annotated in the specifying step. The annotating can be implemented in various ways including, but not limited to, displaying the annotations with a transparent polygon, vertex coloring, texture coloring, or a hybrid technique.

In exemplary embodiments, a method for annotating a page of an electronic document includes selecting a page of the electronic document, the page having a first layer; providing an annotation tool to annotate a specified area of the selected page; specifying the area of the page to be annotated by the annotation tool; annotating a second layer, the second layer corresponding to the page, by marking the specified area of the page with the annotation tool; displaying an annotation corresponding to the specified area, wherein the annotation is displayed in a third layer other than the second layer and the first layer.

In exemplary embodiments, the annotations are displayed by superimposing or placing a layer with an annotation over the page area that is specified to be annotated.

In exemplary embodiments, the annotations are displayed using a texture coloring technique that modifies the texture pasted on the electronic page geometry.

In exemplary embodiments, a part of an annotation may be represented by one of the transparent polygon (which may include, polyline), vertex coloring, and texture coloring annotation techniques during a display period, and another part of the annotation may be represented by a different annotation technique during the same display period.

In exemplary embodiments, the annotations can be displayed in three dimensions to convey depth and/or a different shape than the underlying page.

These and other features and advantages are described in or are apparent from the following detailed description of exemplary embodiments of the invention.

BRIEF DESCRIPTION OF THE DRAWINGS

Exemplary embodiments will be described in detail, with reference to the following figures in which like reference numerals refer to like elements and wherein:

FIG. 9 illustrates an exemplary embodiment of an annotated page of a three-dimensional electronic document displaying an annotation area using a hybrid technique;

FIG. 12 illustrates an exemplary embodiment of an annotated page of a three-dimensional electronic document displaying an annotation area using a hybrid technique;

DETAILED DESCRIPTION OF EMBODIMENTS

The following detailed description illustrates exemplary embodiments of methods and systems for annotating pages of a three-dimensional electronic object. For sake of clarity and familiarity, the specific example of an electronic document is given. However, it should be appreciated that the principles outlined herein can be equally applied to any three-dimensional electronic object.

Producing an annotation on an electronic document may include a specifying stage and a displaying stage. In the specifying stage a reader, viewer or user indicates to a system an areas of a page to which to place an annotation, and instructs the system as to the type of annotation (e.g., a red highlight, a blue arrow, or a free-form line) to place at the areas. The reader may specify an annotation using an input device such as, for example, a mouse or stylus. The system may capture the specification data, during the specification stage, as it is being input. In the displaying stage, the system displays the annotation in a visual format based on the data captured during the specifying stage.

Figure 1:
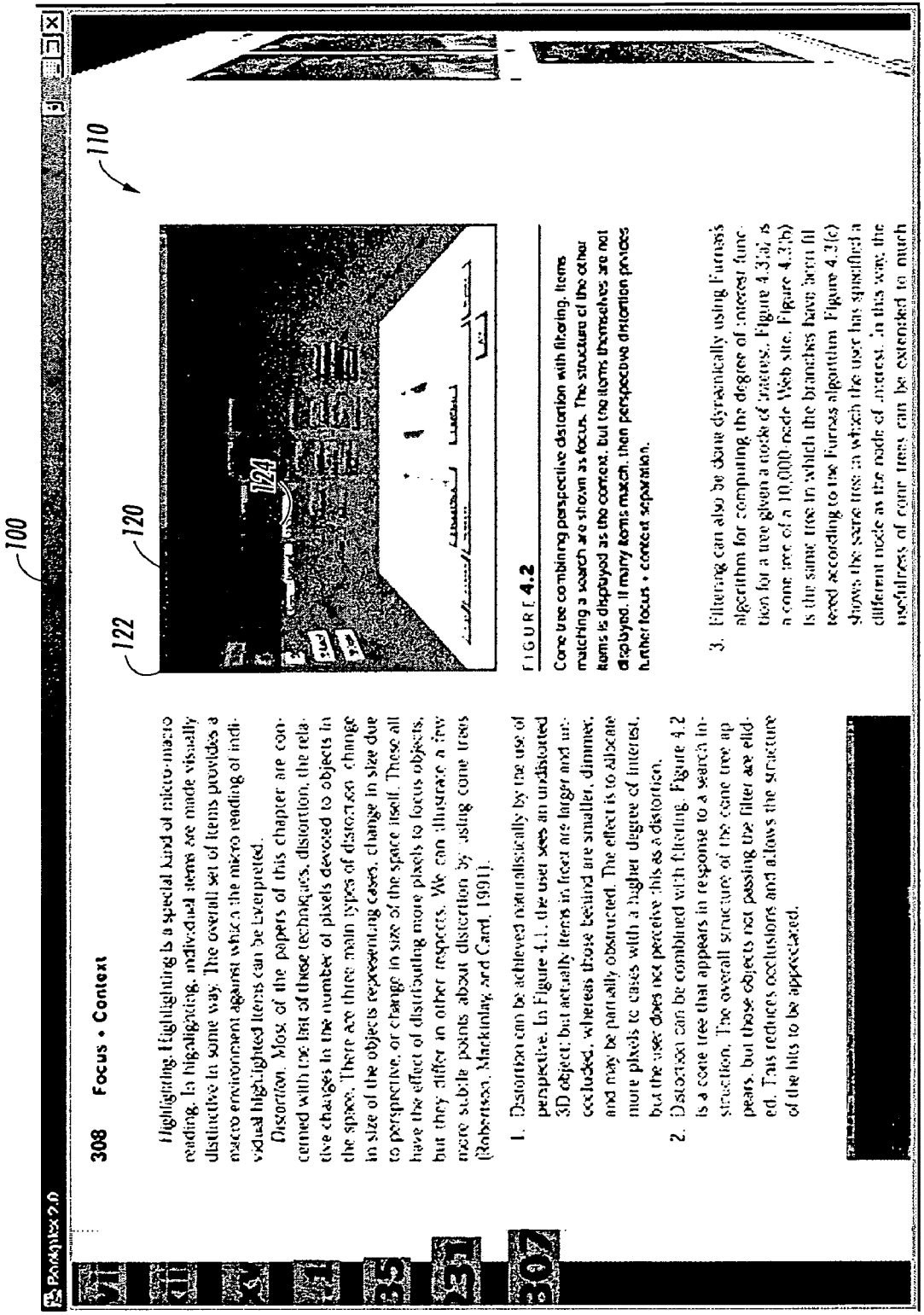
FIG. 1 illustrates an exemplary embodiment of an annotated page of a three-dimensional electronic document, which has been annotated using an electronic annotation tool to define an annotation area.

For example, as shown in FIG. 1, a user specifies an area to be annotated, e.g., highlighted, using a highlighting specification technique to specify an area to be annotated. FIG. 1 illustrates a close-up view of an exemplary embodiment of a three-dimensional electronic document (e-book) 100 containing multiple document pages, such as the depicted document page 110. The document page 110 is annotated with an annotation tool, e.g., a mouse (not shown) that marks a page area 120 of the document page 110 with a specific highlight color.

It will be appreciated that, as used herein, "annotation tool" refers to any device or combination of devices that allows a user to produce a visual enhancement, such as underlining, coloring, text, graphics or the like, on an electronic document. For example, a computer mouse or keyboard manipulates a cursor combined with circuitry and/or software and/or other hardware, such as physical buttons and/or menus on a screen as an annotation tool. An electronic highlighter is one type of annotation tool. Operations of a highlighter will be described in examples below.

Additionally, as used herein, "ink" of course refers not to liquid ink, but rather virtual (e.g., electronically represented) ink used to produce visual enhancement, such as underlining, coloring or the like, on an electronic page.

The system may allow the user to modify the annotation color and/or the ink density if desired. For example, if the user wants to modify the highlighter color, the user may select the color from a drop-down menu. Then, color of the highlighter is modified and new color data is stored when the highlighter is used on an electronic page. If the user wants to modify the ink density, the user may select the ink density from a drop-down menu. Then, the ink density of the highlighter is modified and new ink density data is stored when the highlighter is used on an electronic page.

As the user reads through the e-book 100 shown in FIG. 1, the user may annotate, e.g., highlight, an area of the page by marking a portion of the document page 110 with a highlighter. The portion to be highlighted is defined in this example as a rectangular page area 120 based on the user input. Depending on the annotation technique, the page area 120 may be annotated in a specified color or ink density.

To mark an area, e.g., the page area 120 of the document page 110, the user inputs a command, such as, for example, by operating a mouse to move a cursor to a starting position 122 and pressing a mouse button to anchor a corner of the mark at the starting position 122. The user can then drag the mouse to move the cursor to select the desired area 120 to be marked. As the user drags the mouse, the size of the area 120 changes and the highlight area is updated dynamically providing a visual feedback to the user of the area to be highlighted. The user finalizes the highlighted rectangular page area 120 by releasing the mouse button to anchor another corner of the rectangular page area at an end position 124.

During the mouse action (e.g., the mouse press action, the mouse drag action, or the mouse release action) the mouse communicates with the system to indicate where the mouse action occurred on the display screen. The screen coordinates corresponding to the mouse action are mapped to the local coordinate system of the page to determine where on the three-dimensional document page the user pointed at when the mouse action occurred. In other words, the area specified by the user on the screen is transformed from the screen coordinate system, to the world coordinate system, and further to the local coordinate system of the page. If necessary, the area is further transformed from the local coordinate system of the page to a texture coordinate system of the page. The resulting area is then stored as part of the highlight data.

The world coordinate system, sometimes referred to as the global coordinate system, is the principal coordinate system of a three-dimensional workspace and is independent of viewpoint and display. Individual objects, such as a page, are each defined in their own local coordinate systems within the world coordinate system. The local coordinate systems are each independent from each other and the world coordinate system. Light sources, the viewer, and virtual cameras are positioned in the world coordinate system. In some embodiments the viewer may be the virtual camera.

The screen coordinate system may correspond to the coordinate system of a virtual camera. The location of the camera may correspond to the origin of the screen coordinate system. For example, a reader's eye reviewing the screen corresponds to the origin of a screen coordinate system.

The texture coordinate system defines a texture and is independent from the world coordinate system, screen coordinate system and the local coordinate system. Texture mapping is a process that maps a texture (for example, a high definition image, such as a picture or text) onto an object (e.g., a page). The shape of the object, e.g., a page, is represented with a polygon mesh. The polygon mesh is, generally, a set of vertices connected by edges. A vertex of the polygon mesh has a 3D coordinate (x,y,z) which defines where it is located in the local coordinate system of the page. Each vertex also has a 2D texture coordinate (u,v) for the purpose of texture mapping. For example, the lower left corner of the page may be located at (0,0,0) of the local coordinate system and have a texture coordinate of (0,0). The upper right corner of the page may be located at (pageWidth,pageHeight,0) and have a texture coordinate of (1,1). Note that in this example the texture mapping may require some compressing or stretching of the texture. For a point not lying at any vertex of the polygon mesh, scan conversion determines where the point is located in the local coordinate system, and determines the point's texture coordinate. The texture coordinate determines the point's texture color.

Raycasting is one example of a technique that is used in mapping a screen coordinate to a local coordinate of the page. The raycasting technique includes shooting a ray from a virtual camera (corresponding to the eye of a user viewing the screen) through/from the screen coordinate position of the mouse $(x_m, y_m)$ towards the three-dimensional document. Next, the intersection position, i.e., coordinate points, $(x_w, y_w, z_w)$, of the ray and the page of the three-dimensional document, is calculated. Assuming that the intersection position is represented in the world coordinate system, this point is then mapped from the world coordinate system to the local coordinate system of the page. If necessary, the point represented in the local coordinate system of the page is further mapped to the texture coordinate system of the page.

It should be appreciated that the annotation specification technique described above may be applied to document pages facing straight to the user and/or facing to the user at oblique angles; that the annotation specification technique may be applied to document pages represented as flat three-dimensional and/or curved three-dimensional surfaces; that, although the previous description mentioned a rectangular area to be annotated, an area of any shape, including circles, oblong or oval shapes, and polygons of any numbered sides can be specified by the user in a similar manner; and that, rather than a mouse, other input devices (e.g., a stylus or electronic pen) can be employed to specify the page area to be annotated.

It should also be appreciated that factors other than the location of the annotation area may be used to influence the annotation effect. For example, "covering up" the original contents of the page so that they cannot be viewed after annotating, e.g., highlighting, may be desirable, or allowing the original contents to still be viewable after highlighting may be desirable. The color of the highlight and the ink density of the highlight used will impact whether the original contents can be viewed. If the original contents of the page are to be viewed after highlighting, the original contents of the page that are located in the marked page area may be blended with the highlight color to produce a highlighting effect. Generally, the ink density of the highlight determines how much of the highlight color appears in the blending result. The denser the highlight ink is, the more the highlight color shows in the blending result. To modify both the color and/or the ink density of the highlight, a user interface (not shown) can be provided that allows the user to change the color and/or ink density of the highlight.

It should be appreciated that, as the annotation, e.g., highlight, is created, annotation data pertaining to the annotated area including the area boundary, the color, the ink density and/or the like is stored in the system for annotating three-dimensional documents and correlated with the corresponding page. The system for annotating three-dimensional documents is intended to display the annotation on the page as the annotation area is gradually defined. Additionally, whenever the page is revisited, e.g., due to backward and/or forward page turning, the annotation is recreated from the stored annotation data and displayed on the corresponding page.

The following detailed description of methods and systems for annotating pages of three-dimensional electronic documents, such as e-books discloses exemplary embodiments of methods and systems of displaying a user specified annotation, such as highlights, using transparent geometric shapes, vertex coloring, texture coloring and/or a hybrid technique.

Figure 2:
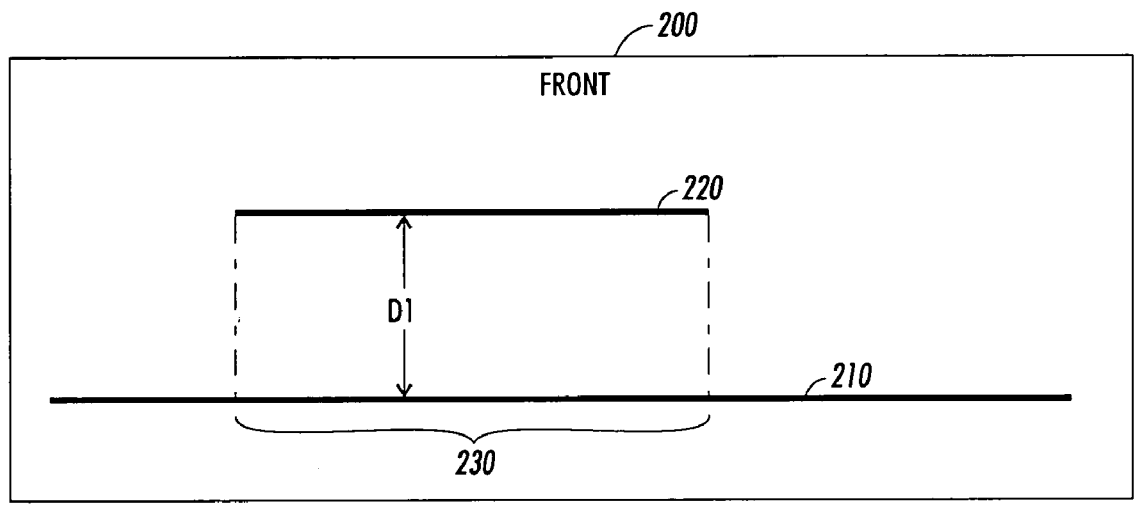
FIG. 2 illustrates an exemplary embodiment of an annotated page of a three-dimensional electronic document displaying an annotation area using a transparent polygon technique.

Hereafter, a polygon will be used as a geometric shape. FIG. 2 illustrates an embodiment of displaying an annotation 200, e.g., highlight, by using a transparent and/or translucent polygon 220 (hereafter, referred to as "transparent polygon" for convenience) and superimposing or placing the transparent polygon 220 over the page area 230, of a three-dimensional page 210, that is to be highlighted. The highlight may be created by a highlighting specification technique described previously. The location and size of the transparent polygon 220 is preferably equal to the location and size of the page area 230, which is determined by the stored highlight data. The color of the polygon 220 reflects the color of the highlighter, and the opacity of the polygon 220 models the ink density of the highlighter.

Superimposing the transparent polygon 220 over the page area 230 that is to be highlighted creates a "Z fighting" problem. The problem of Z fighting arises when two overlapping, co-planar polygons P1 and P2 are displayed. During scan conversion, polygon P1 may have some pixels in front of polygon P2 and other pixels behind polygon P2. As a result, there is no clear separation between polygon P1 and polygon P2. As such when a user views a page from the front side of the page, as viewed from the side of polygon 220 labeled "FRONT," part of the transparent polygon 220 may be in front of the page area 230 and part of the transparent polygon 220 may be behind the page area 230 (i.e., be blocked from the user's view by the page area 230). To avoid the Z fighting problem, the transparent polygon 220 is offset/elevated (for example, along a "z" axis, if the plane corresponding to the page is defined by "x" and "y" axes) from the page 210 towards the front side of the page by a distance D1. The minimum offset distance may depend, e.g, on the Z buffer of the graphics hardware.

Figure 3:
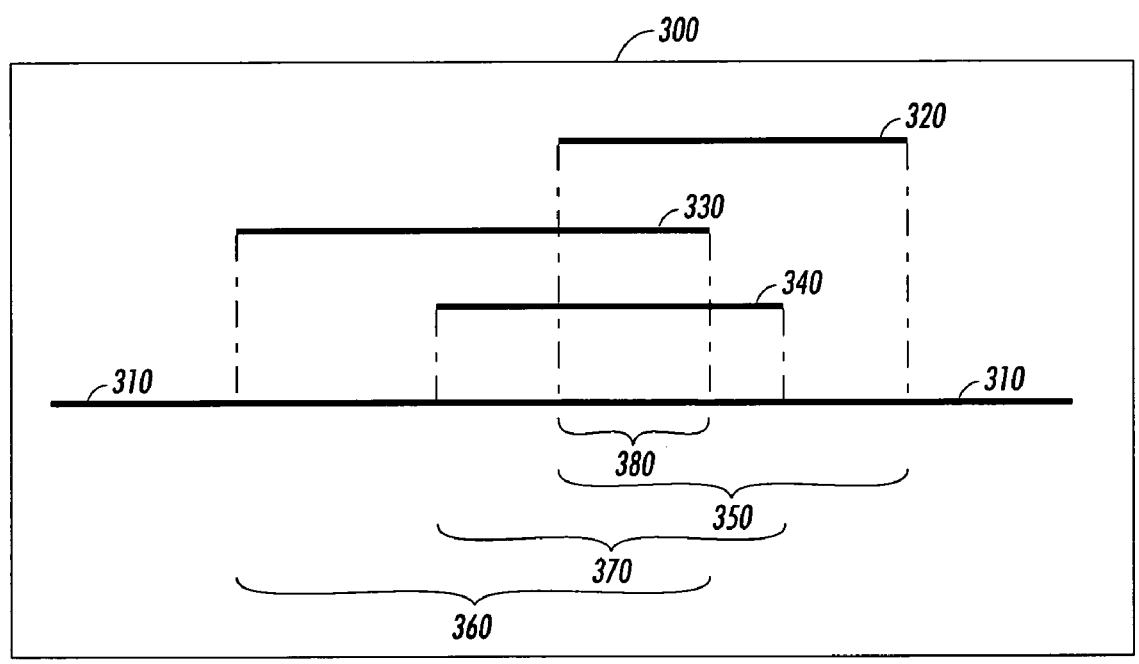
FIG. 3 illustrates an exemplary embodiment of an annotated page of a three-dimensional electronic document displaying three annotation areas using a transparent polygon technique.

FIG. 3 illustrates an exemplary embodiment of the step of displaying annotations 300 by superimposing multiple transparent polygons 320, 330, 340 over three page areas that are to be annotated 350, 360, 370 of a three-dimensional page 310. When multiple transparent polygons 320, 330, 340 overlap a common area 380 of the three-dimensional page 310, the transparent polygons 320, 330, 340 are offset from each other to avoid the Z fighting problem. However, as multiple annotations, e.g., highlights, are created and/or removed, algorithms for determining the offset for new polygons created by additional annotations of the three-dimensional page 310 becomes increasingly complex.

Figure 4:
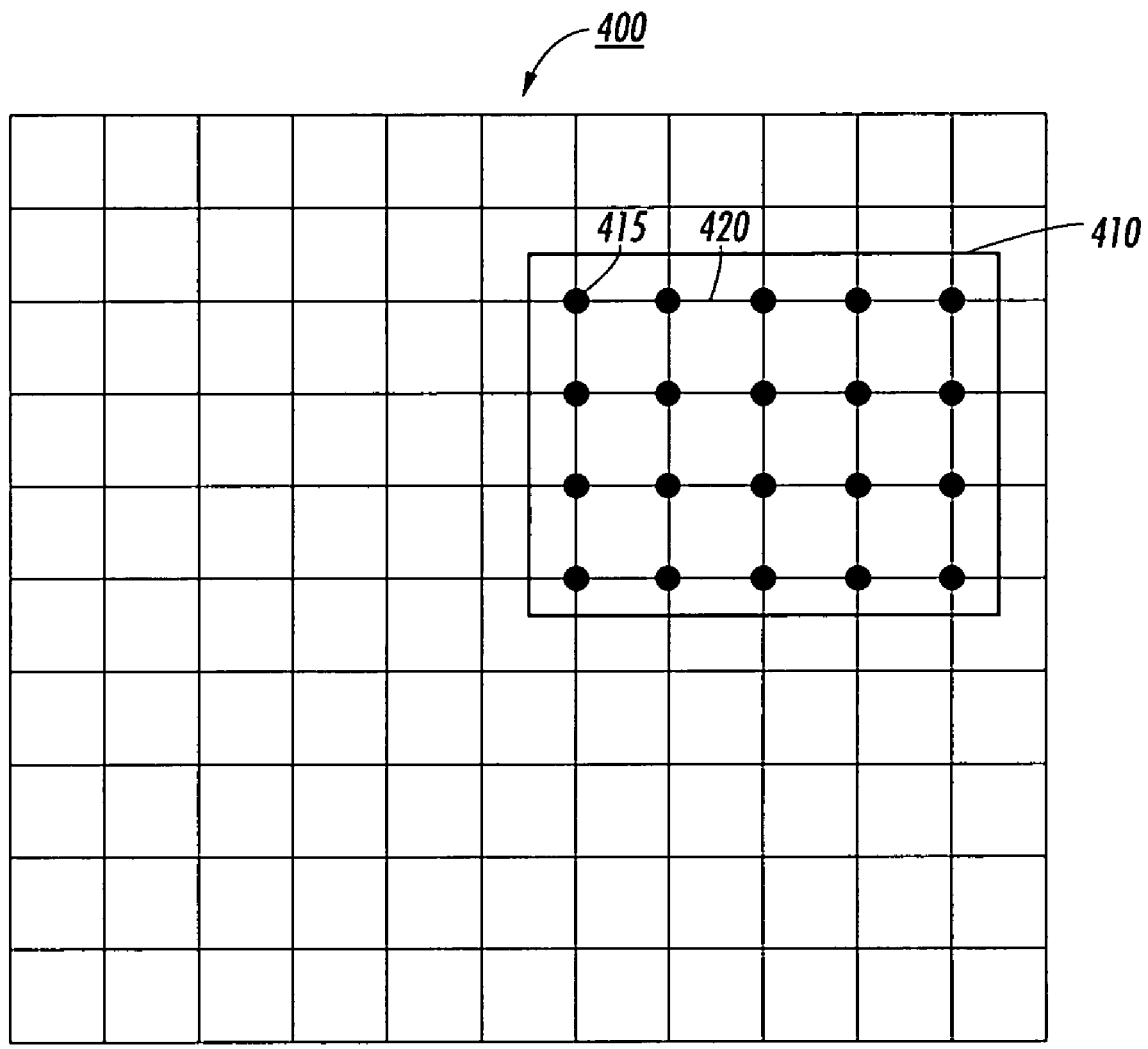
FIG. 4 illustrates an exemplary embodiment of an annotated page of a three-dimensional electronic document displaying an annotation area using a vertex coloring technique.

FIG. 4 illustrates an exemplary embodiment of displaying an annotation, e.g., highlights on a page 400, using vertex coloring to color those vertices within the three-dimensional page area 410 that are to be annotated. The vertex coloring technique has advantages over the transparent polygon technique because it can avoid some of the system complications associated with the transparent polygon technique when surfaces which are to be viewed as curved are annotated. For example, in the transparent polygon technique, if a page is curved, e.g., when turned, after being highlighted, the transparent polygons associated with the highlight must also be curved. As in the transparent polygon technique, and as illustrated in FIG. 4, in the vertex coloring technique the polygonal boundary specified by the user determines the page area 410 that will be annotated. However, after determining the boundary of the polygon area 410, i.e., the area to be annotated, the polygonal area 410 is additionally transformed from the local coordinate system of the page to the coordinate system of the texture corresponding to the page. This transformation takes place during the specification stage. The resulting texture coordinates are stored as part of the annotation data.

As shown in FIG. 4, the page 400 can be represented as a geometric object. In FIG. 4 the page geometry is represented as having a polygon mesh. The polygon mesh is a computer graphics technique which approximately represents a three-dimensional object, such as the three-dimensional page, using vertices 415 connected by edges 420. Once a user inputs the boundary of the polygon area 410 to be annotated, the vertices 415 lying inside the user-specified polygonal area 410 can be identified. After the vertices 415 are identified, the colors of the identified vertices 415 are re-evaluated as a function of the annotation color and the ink density. Re-evaluation may change the colors of the vertices. The colors of the vertices inside and outside the polygonal area 410 of the polygon mesh may subsequently be interpolated and then blended with the page texture corresponding to the page to produce an annotating effect.

However, the vertex coloring technique may produce noticeable artifacts, e.g., at the annotation boundary, resulting from the bi-linear interpolation of vertex colors occurring from the scan conversion of the polygon mesh. Although using a finer polygon mesh will, to a certain degree, ameliorate the annotation boundary, a finer mesh will require more vertices to be processed and somewhat impact the processing speed of the system.

Figure 5:
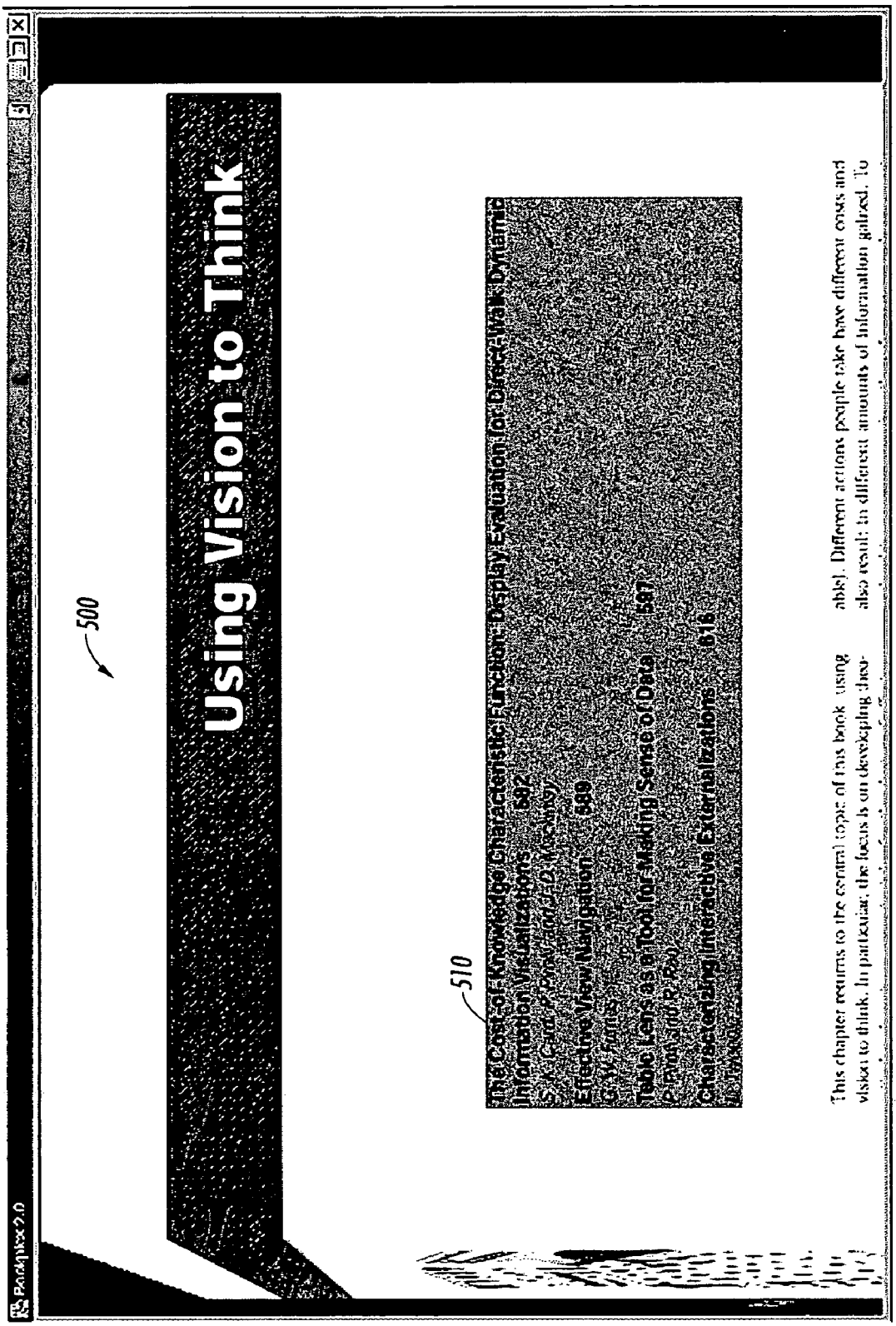
FIG. 5 illustrates an exemplary embodiment of an annotated page of a three-dimensional electronic document displaying an annotation area using a texture coloring technique.

FIG. 5 illustrates an exemplary embodiment of displaying an annotation, e.g., highlight, using the texture coloring technique. In the texture coloring technique, the page texture is modified and/or updated to display the annotated data. As discussed above, the page texture is a layer corresponding to the page and used to represent high resolution images. Moreover, like the vertex coloring technique, in the texture coloring technique the page is represented by a polygon mesh. Each vertex of the page has a texture coordinate in the texture coordinate system of the page.

The texture coloring technique employs many of the same steps used by the transparent polygon and vertex coloring techniques. Like the vertex coloring technique, after determining the boundary of the polygon area 510, e.g., the area to be highlighted, in the specification stage, the polygonal area 510 is additionally transformed from the local coordinate system of the page (i.e., polygon mesh) to the coordinate system of a texture corresponding to the page. The resulting texture coordinates are stored as part of the highlight data. Thus, the page texture and the associated highlight data is separate from the page during annotation specifying; however, after specifying an annotation, the associated annotation is blended to the page texture, which is then pasted onto the page geometry. FIG. 5 illustrates the page texture pasted on the page 500 (i.e., page geometry). The entire image shown on the page 500 corresponds to the texture.

In the texture coloring technique, a blending step may also be performed to achieve the annotation effect. The blending step includes computing the color of each texture pixel within the annotated polygonal area 510. The color of the texture pixel may be determined by satisfying the following relationship: $C_t = (1.0 - \text{density}) * C_t + \text{density} * C_h$, where $C_t$ is the color of the pixel, $C_h$ is the color of the annotation, and density is the ink density of the annotation normalized to be in the range of 0.0 to 1.0. The blending operation produces a new texture for the page geometry. The new texture is then applied to the page 500 by pasting the new texture onto the page geometry.

The texture coloring technique produces relatively well-defined boundaries for the annotated areas because, as discussed above, the page texture generally has a higher resolution than the polygon mesh. Therefore, the bi-linearly interpolated texture coordinates are generally more visually appealing than the result of the bi-linearly interpolated vertex colors.

Figure 6:
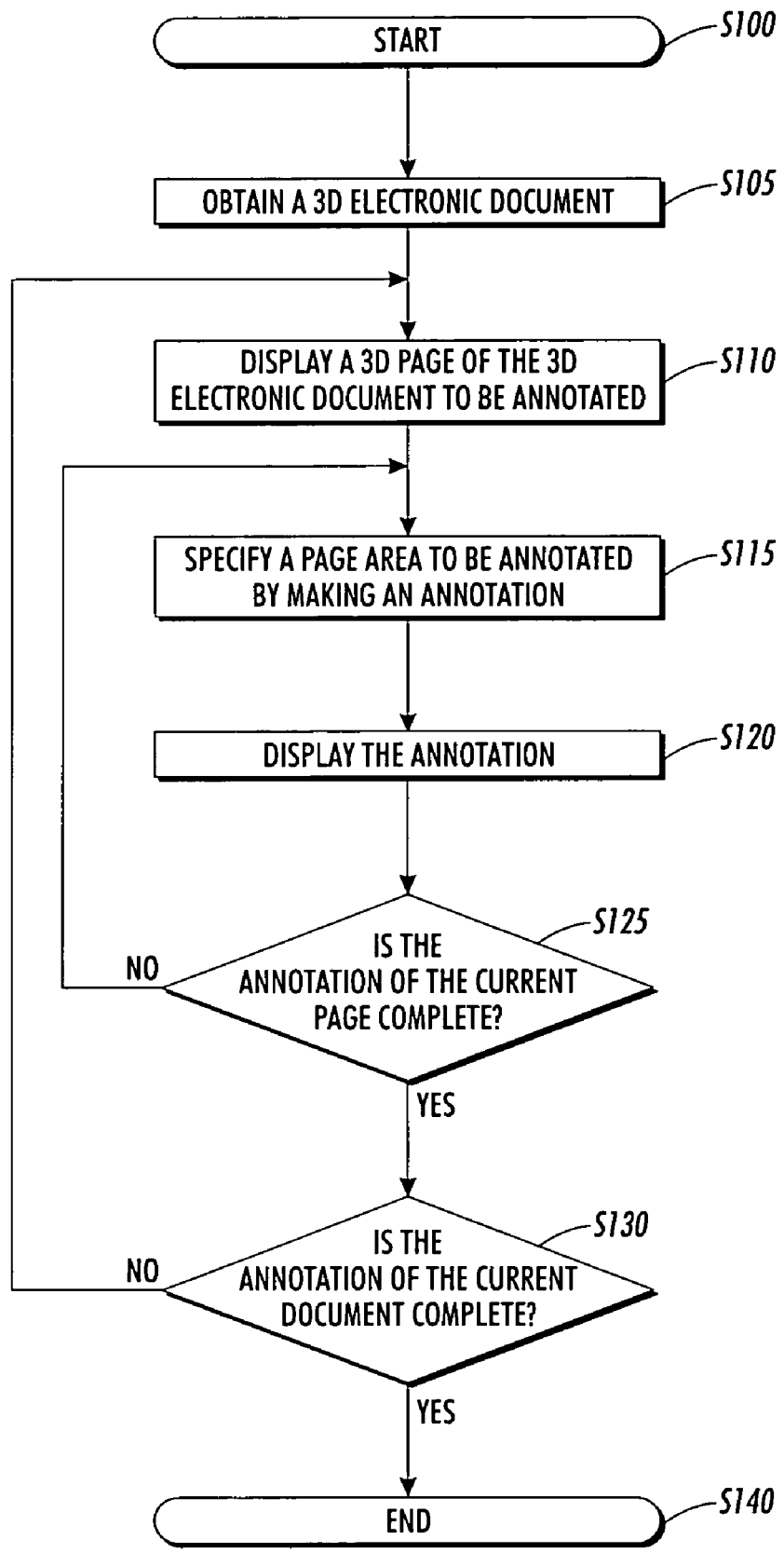
FIG. 6 illustrates a flowchart outlining an exemplary embodiment of a method for annotating pages of a three-dimensional electronic document.

FIG. 6 is a flow chart illustrating an outline of an exemplary embodiment of a method for annotating three-dimensional documents. As shown in FIG. 6, operation of the method begins in step S100, and continues to step S105, where a three-dimensional document is obtained. Then, in step S110, a three-dimensional page of a three-dimensional document to be annotated is turned to based, e.g., on a user input, and displayed. A user may use a drop-down menu, a mouse button, or other input device to select a page to be turned to.

Next, in step S115, a page area of the three-dimensional page to be annotated is specified by marking an annotation on the screen. The annotation data (e.g., data corresponding to the movement of an annotation input device (e.g., pen), the polygon boundary, annotation color, ink density, etc.) relating to the specified page area is correlated with the page by mapping the boundaries of the annotation data from the screen coordinate system to the page and texture coordinate systems. The correlated annotation data is then stored with other data (e.g., the page texture) of the page to be annotated. Then, in step S120, an annotation is displayed based on the annotation data. Next, in step S125, it is determined whether the annotation of the current page is completed. This determination may be based on, e.g., a clock or whether the page has been turned. If so, operation continues to step S130. If not, operation returns to step S115.

In step S130, it is determined whether the annotation of the current document is completed. This determination may be based on, e.g., a clock or whether the document has been closed. If so, operation continues to step S135 where the method ends. If not, operation returns to step S110.

It should be appreciated that annotation is not necessarily performed as a single activity. More likely, annotations are added as the user is reading through a document. For example, a user may read a page and find an area of the page to be annotated, e.g., a few interesting sentences on the page. The user can then mark the sentences with an annotation tool, e.g., a highlighter, and then continue to read through the document. In other words, the user can perform other activities between annotations such as reading, turning pages and/or the like.

Figure 7:
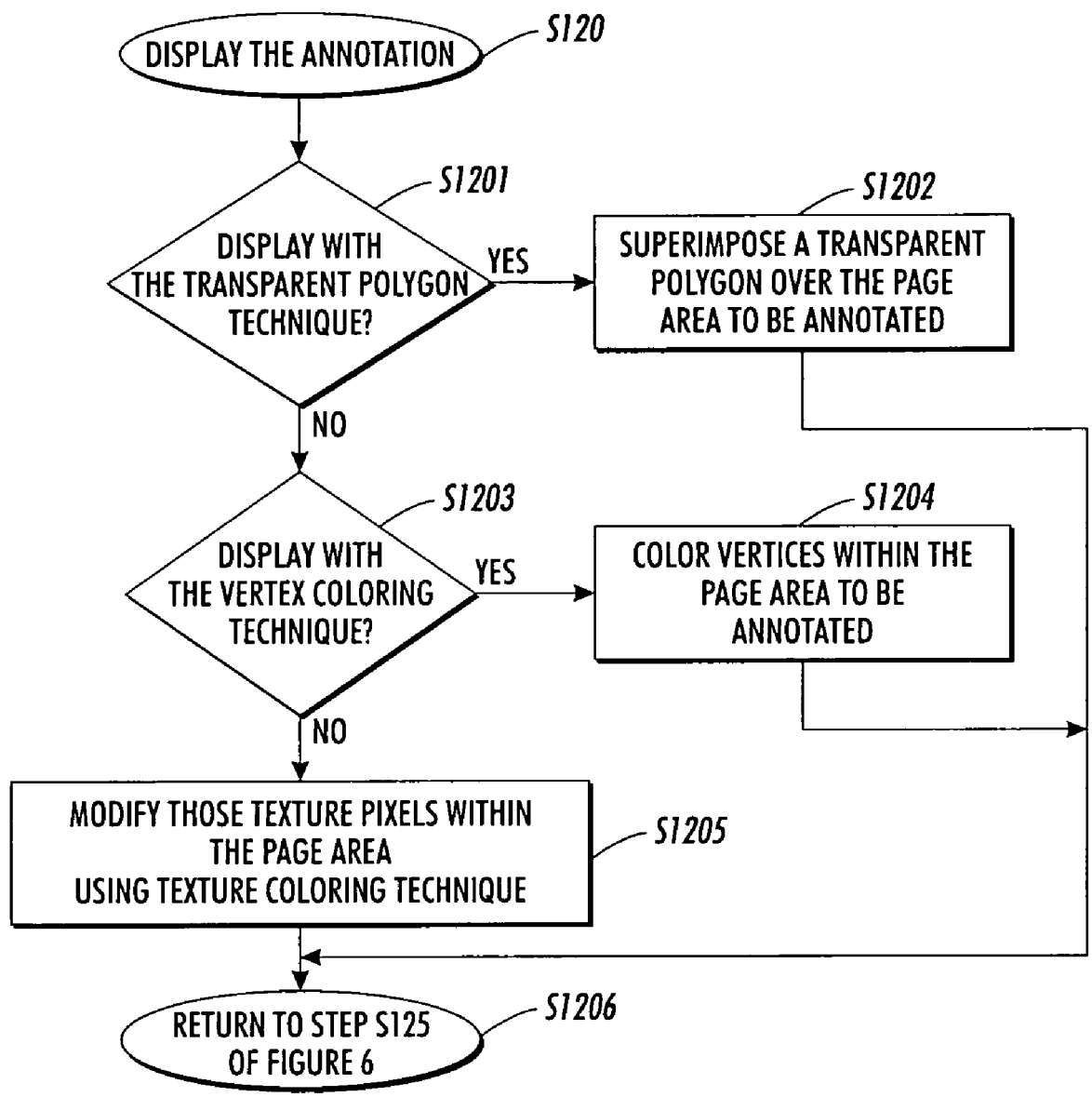
FIG. 7 illustrates a flowchart outlining an exemplary embodiment of a method for displaying annotations in the page area of a three-dimensional electronic document that has been annotated.

FIG. 7 is a flow chart outlining an exemplary embodiment of a method for displaying an annotation. For convenience, the method of FIG. 7 may be considered a detailed method of performing step S120 of FIG. 6. Thus, operation of the method of FIG. 7 begins in step S120, and continues to step S1201, where it is determined whether the annotation is to be displayed with a transparent polygon technique. If so, operation continues to step S1202. In step S1202 a transparent polygon is superimposed over the page area to be highlighted. Operation then jumps to step S1206 and returns to step S125 of FIG. 6 where a determination is made whether the current document's page annotations are complete. If, in step S1201, the transparent polygon technique is not to be employed, operation jumps to step S1203.

In step S1203 it is determined whether the annotation is to be displayed with a vertex coloring technique. If so, operation continues to step S1204. Otherwise, operation jumps to step S1205.

In the vertex coloring technique, in step S220, all vertices within the page area to be annotated are colored. Operation then jumps to step S230.

If the vertex coloring technique is not employed, then, in step S225, those texture pixels within the page area to be annotated are modified using the texture coloring technique. Operation then continues to step S1206 and returns to step S125 of FIG. 6 where a determination is made whether the current document's page annotations are complete. The determinations in steps S1201 and S1203 may be based on, e.g., a user input, or be preprogrammed into the system and based on variables such as the size of the page and/or document, or the processing speed and memory of the system.

As discussed above, the texture coloring technique has advantages over the transparent polygon and vertex coloring techniques and, as such, the texture coloring technique is a preferred method. Moreover, generally, when a reader is interactively involved with a document, the reader generally desires quick frame rates, i.e., quick updates of the screen information, as the information is input. For example, the reader may be interested in quick frame rates during two scenarios, 1) when an annotation is being specified by a reader, and 2) when a page on which the annotation was specified is re-visited (e.g., due to page turning). As such, the blending operation of the texture coloring technique needs to be carried out quickly when a reader is interactively involved with a document and a high processing speed/quick frame rate is desired. However, the computational speed of the blending operation depends on the resolution of the page texture to be pasted on the page, along with system constraints, such as, for example, available memory and/or processing speed. For example, as the resolution increases, the number of pixels to be processed by the blending operation also increases. As the number of pixels to be processed increases, the potential for a bottleneck and a failure of the blending operation to be performed quickly can develop.

In the second scenario, where a reader re-visits the page on which the annotation was specified, multi-resolution texture features used in features for turning a page of a three-dimensional document can be used to lower the resolution of the texture for a specific time and, thus, reduce the possibility of a bottleneck forming in the system. For example, when user responsiveness is desired, e.g. to generate the first frame of a page turning animation, the blending operation can be performed using a low-resolution texture for the page. This significantly reduces the overhead of the blending operation because the number of pixels to be processed is reduced from the number of pixels processed for a high-resolution texture. When, on the other hand, a high image quality is desired, e.g., at the end of the page turning animation, the blending operation can use the higher resolution page texture. In other words, the system may, for example, initially display the low-resolution texture, and then automatically change to display a high-resolution texture after the page turning animation is complete.

However, unlike the scenario when a page on which the annotation was specified is re-visited (e.g., due to page turning), a high resolution is generally desired before, during and after the annotation is initially specified by the reader. As such, multi-resolution page texture features, such as used with page turning, cannot be easily adapted to reduce the possibility of bottlenecks developing in the system. For example, if the resolution of the texture on a page is changed when the reader specifies an annotation on a page visual artifacts will be produced.

Figure 8:
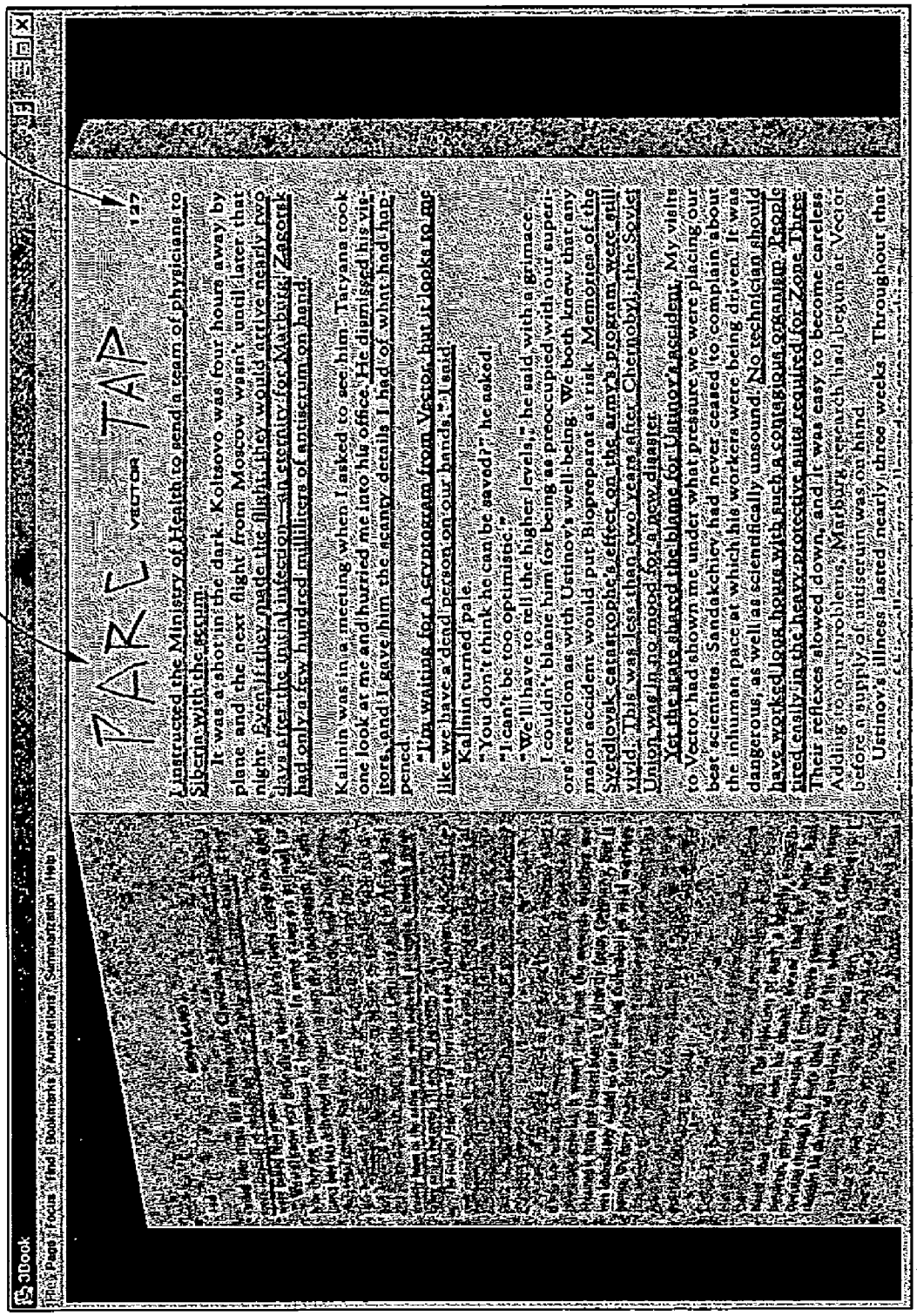
FIG. 8 illustrates an exemplary embodiment of an annotated page of a three-dimensional electronic document displaying an annotation area using a texture coloring technique.

FIG. 8 illustrates an exemplary method for annotating three-dimensional documents. As illustrated in FIG. 8, pen-based annotations 610, i.e., annotations with a stylus, may be used as a method for annotating three-dimensional documents. Pen based annotations allow the user to sketch out free-form annotations.

Handwritten annotations 610 can be decomposed and approximated with a set of strokes where each stroke has a trajectory, width, color, and ink density. The trajectory of a stroke is captured as the user annotates the page 600 by sliding the stylus (not shown) from one location of the three-dimensional page 600 to the next location of the three-dimensional page 600. The width, color, and ink density of a stroke can be modified by the user with a user interface (not shown). The stroke trajectory, coupled with stroke width, generally defines the footprint of the stroke on the display screen. This footprint can be approximately represented as a polygon or other shape. For convenience, "polygon" is used hereafter as an example.

After the specification stage discussed previously, the annotation, i.e., polygon, is transformed from the screen coordinate system to the local coordinate system of the three-dimensional page 600. If necessary, the polygon is further transformed from the local coordinate system of the page 600 to the coordinate system of the texture corresponding to the page 600. The annotation data, e.g., the polygon boundary, the color, and the ink density, is then stored and correlated with the respective page. Although the handwritten annotation can be displayed using any of the display techniques previously discussed, the texture coloring technique is the preferred display technique.

It should be appreciated that the previously described annotation operations may be modified to support other types of annotations for three-dimensional documents. For example, at the specification stage, by using a mouse or a stylus the user can indicate where on the three-dimensional page to place a text annotation. This location is transformed from the screen coordinate system to the coordinate system of the texture corresponding to the page. Then, by using a keyboard, the user can input the content of the text annotation. Alternatively, the content of the text annotation can be specified in a handwritten manner using the stylus. At the display stage, the content of the text annotation can be rendered as an ink layer and blended with the original page texture to create a new texture, which is pasted on the page geometry. Thus a transparent or opaque text annotation can be shown on top of the original content of the three-dimensional page.

FIG. 8 illustrates an exemplary embodiment of an annotation of a document page in a virtual three-dimensional document. Virtual three-dimensional document systems often have a relatively low frame rate speed and display a page with a texture at a relatively high resolution. In FIG. 8, "PARC TAP" was written using a stylus or pen in a top margin of the document page and captured on a high-end desk top, such as a Dell, Precision 340 equipped with an ATI 9700 PRO graphics card. In FIG. 8, the words "PARC TAP" were deliberately written slowly; however, the words "PARC TAP" were not captured adequately enough by the system for the words "PARC TAP" to be considered by a reader as naturally written. In particular, the curves on the letters "P", "C" and "R" were not captured as curves (to the extent that a "curve" can be written by a reader) but, instead, captured as individual line segments.

One factor in the failure of the system to capture the curves of the letters is the low frame rates of the three-dimensional document system used in FIG. 8. The low frame rates limit the number of visual updates provided back to the reader as the reader annotates the document page. Pen events correspond to the reader's annotation of the page, such as, for example, the movement of a stylus on the page. A system with low frame rates is unable to capture enough pen events corresponding to the pen movement in real time. The latency (i.e., time) between two consecutive frames is one factor that determines the ability of the system to capture pen events and display the annotation as the reader annotates the page. In the example shown in FIG. 8, due to the low frame rates, the latency between two consecutive frames was significant enough that the system only captured a few pen events corresponding to each of the curves. As such, the displayed curves include only a few line segments.

Frame rates are impacted negatively by, at least, 1) the texture resolution of the page (e.g., texture resolution needs to be high enough to make the text on the page readable), and 2) the blending operation of the high-resolution texture of the page with the annotation layer and the other layers of visual augmentation, such as word/sentence underlining and highlighting, that were placed on the texture. For example, as other layers are sequentially blended with the texture, these layers are usually rendered on top of the annotation layer. As such, changes to the annotation layer entail the re-evaluation of the other layers that were placed on top of the annotation layer. Moreover, an additional factor negatively impacting frame rate speed is that after all of the layers are blended with the texture, the new texture is sent from the main memory to the texture memory of the graphics card and rendered.

The problem of low frame rates impacting the visual quality of annotations on a page can be alleviated with faster/more advanced CPUs and graphic cards; however, as faster CPUs and more advanced graphic cards are used, it is also anticipated that three-dimensional document systems will use textures with higher resolutions (e.g., to support multi-monitors, i.e., systems comprising multiple monitors before a viewer) and, similarly, employ more layers of visual augmentation.

The following detailed description discloses a hybrid technique for annotating pages of three dimensional documents and discloses exemplary methods and systems providing an increased interactive rendering and displaying speed at the annotation specifying stage.

Figure 9:
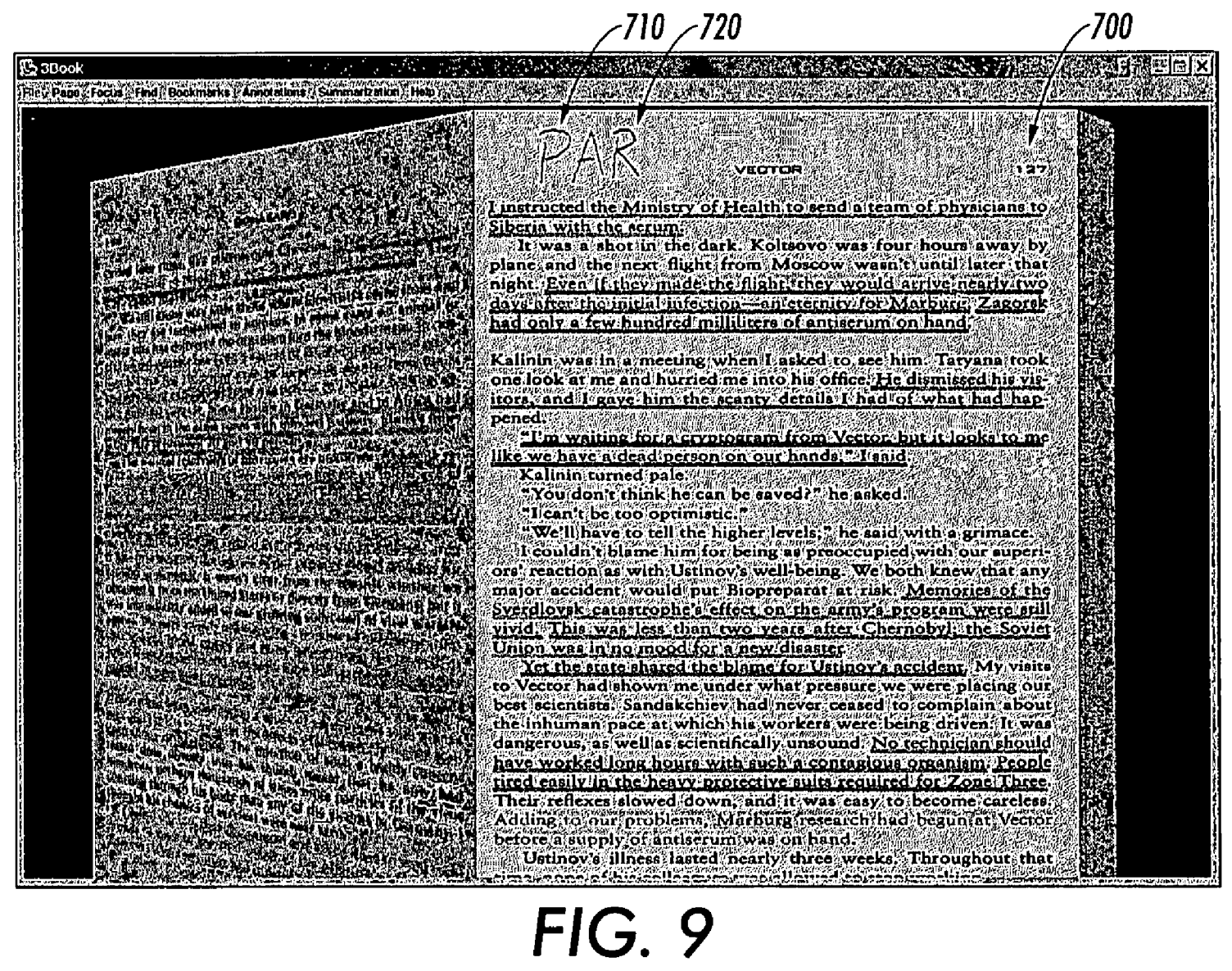

A hybrid technique uses one annotation technique, e.g., the polyline technique, for one part of an annotation and another annotation technique, e.g., the texture coloring technique, for another part of an annotation such that the entire annotation can be displayed "on the fly" at interactive speeds acceptable to a reader viewing an annotation when, for example, the reader is specifying an annotation. For example, FIG. 9 illustrates a free-form annotation of the letters "PAR" in the top margin of a document page. The word was annotated on the page by a reader using an electronic pen.

As shown in FIG. 9, a reader annotates the page by moving the pen on the page. The pen movements correspond to a set of strokes. For example, as shown in FIG. 9, the letter "A" may consist of three strokes "/", "\" and "-". In three-dimensional systems, a reader uses a sequence of pen events to specify a stroke. A pen "down" event indicates the beginning of a new stroke. Moving the pen while holding the pen down sketches the trajectory of the stroke. A pen "up" event denotes the completion of a stroke. Each stroke can correspond to a group of connected lines, commonly referred to as a polyline.

Figure 10:
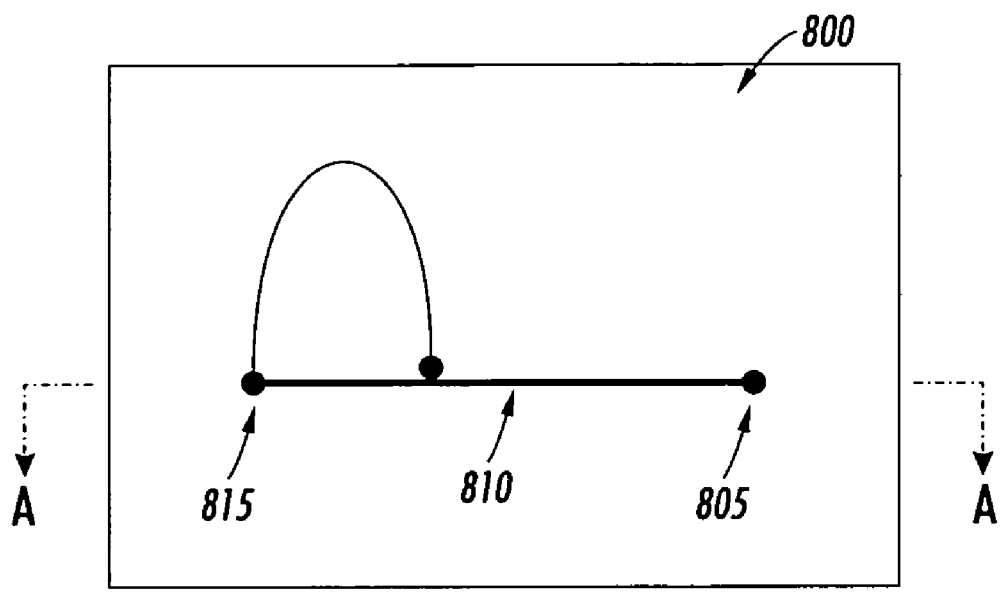
FIG. 10 illustrates an exemplary embodiment of an annotated page of a three-dimensional electronic document displaying an annotation area using a hybrid technique.
Figure 11:
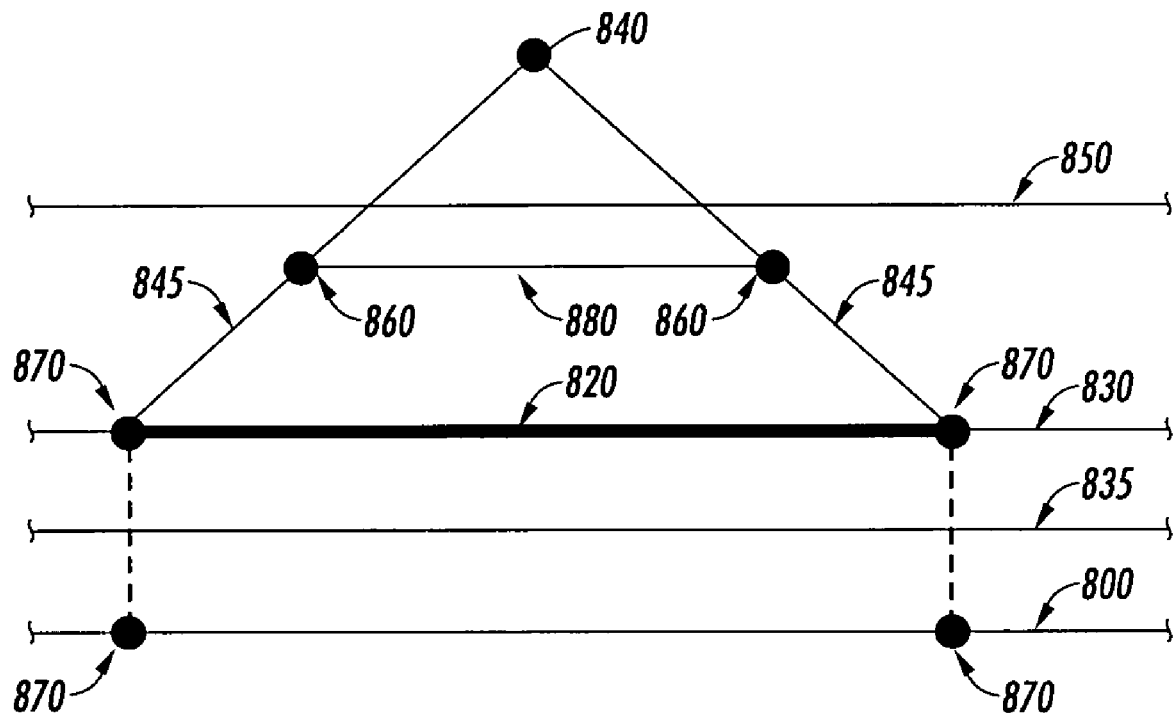
FIG. 11 illustrates a cross-section of the annotated three-dimensional page shown in FIG. 10 displaying an annotation area using a hybrid technique.

FIGS. 9, 10 and 11 illustrate an exemplary embodiment of a hybrid technique for annotating an area of a page of an electronic document. FIG. 10 illustrates a view of an electronic page 800. FIG. 11 illustrates a cross-section view of the page 800 taken along line A-A of FIG. 10, through the leg of the letter "P" that has been annotated on the page. In the illustrated hybrid technique, as the reader specifies an annotation, for example, by sketching a stroke 810 between a beginning point 805 and an ending point 815, 3D polyline segments 820 corresponding to the pen events of the stroke are created on an annotation layer 830. Layer 835 is a page texture layer. Annotation layer 830 and page texture layer 835 are shown as separate layers from the page 800; however, these layers may be intrinsic therewith, i.e., the information of the separate layers may actually be formed and/or stored as parts of the same layer. The annotation layer 830 and texture layer 835 have coordinates that correspond to the page geometry (e.g., polygon mesh) of the page 800. The stroke 810 is captured as a 3D polyline segment 820 by transforming the specified area marked on the screen from the screen coordinate system to the local coordinate system of the page and to the corresponding coordinates of the annotation layer.

A raycasting technique can be used to perform the transformations. During the specifying stage, a ray 845 is shot from a camera 840 through the screen 850 position of a point, corresponding to the point marked by the mouse, towards the page 800. By using the coordinates of the intersection of the ray 845 with the 3D polyline 820, on the annotation layer 830 and the page 800, a point(s) 860 corresponding to the 3D polyline 820 are computed slightly behind the near clipping plane 850 (i.e., "lens") and in front of the far clipping plane (not shown) of the camera frustum of the virtual camera, i.e., slightly behind the plane 850 in FIG. 11. At the same time, the local coordinates of the page corresponding to the intersection coordinates, i.e., the points 870 where the rays 845 strike the page 800, and subsequently, the intersection's texture coordinates, are calculated.

FIG. 11 shows four layers: the page geometry layer 800, the page texture layer 835, the page annotation layer 830, and the 3D polyline layer 880. The page geometry layer 800, the page texture layer 835, and the page annotation layer 830 are all located in the same space. That is, in FIG. 11, they should all be located at the same location. However, for the basic, conceptual, understanding of the hybrid technique, the layers 800, 830 and 835, are shown as separated. Moreover, although layers 800, 830 and 835 are illustrated as generally parallel, and flat, the layers may not be parallel or flat (e.g., the layers may be curved). During the specifying stage the representations of the stroke are computed on both the page annotation layer 830 and the 3D polyline layer 880. However, only one of these two representations is displayed at any moment. The representation on the 3D polyline layer 880 is used as the stroke is being sketched out. Once the stroke is specified, the representation on the 3D polyline layer 880 is removed. Once the representation is removed from the 3D polyline layer 880, the representation on the page annotation layer 830 is displayed by the texture coloring technique.

As previously described, the representation on the page annotation layer 830 may be computed by using a raycasting technique. As discussed above, given a point on the screen, raycasting can be used to compute a corresponding point on the 3D polyline layer 880, by shooting or starting a ray from a virtual camera 840 through a point on the screen 850, and extending the ray a little bit beyond the point on the screen 850. The extension of the ray provides point 860 which is slightly behind the near clipping plane 850.

The stroke 810 is represented during the displaying stage by connecting those points 860 located slightly behind the near clipping plane 850 to form three-dimensional ("3D") polyline segments 880. The 3D polyline segments 880 connecting those points 860 are rendered and displayed with the existing page texture and other annotations of the page 800.

The 3D polyline segments 880 correspond to the annotation, i.e., stroke 810, that the reader placed on the page 800 in the specifying step. The 3D polyline segments are placed in layer 880. Layer 880 is located slightly behind the near clipping plane 850 of the camera frustum to ensure that the annotation will be displayed, as viewed by a reader, as on the top of the page 800, and thus, avoid a Z fighting problem. Moreover, because the 3D polyline segments 880 are not part of the page texture, the 3D polyline segments 880 can be efficiently rendered and displayed by related art graphic cards. As such, the 3D polyline segments 880 of the hybrid technique are independent of the page's texture resolution, and thus enable frame rate speed to increase.

Once a specific stroke has been completed, a reader may move to specify the next stroke. During the intermittent time between strokes, the 3D polyline segments 880 can be removed and the page texture layer updated and applied to the page geometry. The page texture can be updated with the texture coloring technique.

For example, FIG. 9 illustrates a snapshot taken as a user annotates a document page with the words "PARC TAP". As illustrated in FIG. 9, the letters "P" and "A", as well as the first stroke of the letter "R", were rendered and displayed with the texture coloring technique. The second stroke of the letter "R", indicated by the darker color, is represented as 3D polyline segments.

Alternatively, the 3D line segments can be used to represent the entire annotation as the annotation is being sketched out, and not removed between strokes. At the end of the annotation specifying, the 3D line segments can be removed and the texture can be updated to display the annotation with the texture coloring technique. If this exemplary embodiment is employed, the end of the annotation specifying step must be explicitly declared by the reader or implicitly detected by the system.

While the exemplary embodiment illustrated in FIG. 9 indicates a free-form annotation, the hybrid technique can be used to support highlighting annotations as well. For example, when a highlighted area is specified, a transparent 3D polygon may be created instead of a 3D polyline. The vertices of the polygon may be computed according to where on the computer screen the annotation input events occur. The vertices are preferably placed slightly behind the near clipping plane of the camera frustum to ensure that the transparent polygon is displayed on the top of the page and covers the area that the reader intends to highlight. Alternatively, instead of a transparent polygon, a reader may indicate and a system may render only the edges of the polygon. In contrast to the embodiment of a transparent polygon, if only the perimeter edges of the polygon are rendered the text under the highlighted area is unaffected and visible throughout the specifying stage. At the end of the highlight specifying, the geometric representation corresponding to the polygon is removed and the texture is updated to display the highlight with the texture coloring technique.

Figure 12:
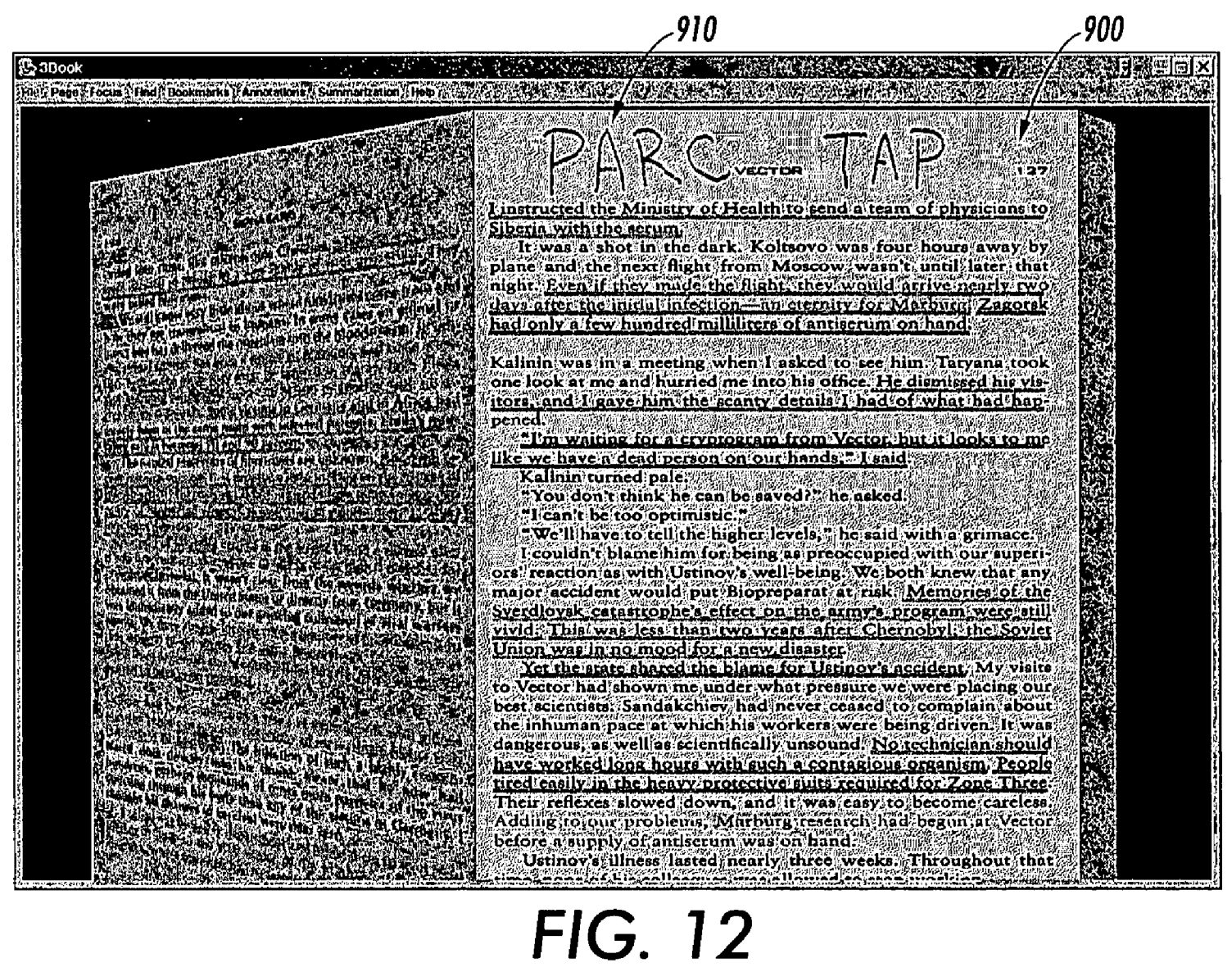

FIG. 12 illustrates an annotation captured using the same desktop as that used to capture the annotation illustrated in FIG. 8. FIG. 12 illustrates an annotation 910 of "PARC TAP" on electronic page 900. The annotation was obtained using the hybrid annotation technique. Because the hybrid technique displays a part of the annotation slightly behind the near clipping plane and other parts of the annotation using the texture coloring technique, the annotation technique achieves quicker frame rates than the frame rates obtained using the texture coloring technique. Thus, unlike in FIG. 8, where the user deliberately slowed pen movements down to allow the system to process the pen events, a user does not have to deliberately slow down pen movements when annotating a document page.

However, as illustrated in FIG. 9, strokes displayed with the texture coloring technique and strokes represented as 3D polyline segments differ slightly in visual appearance. For example, in FIG. 9 the strokes displayed using 3D polyline segments are shown in a darker color. The appearance of parts of the annotation can be modified, for example to match other parts of the annotations, by adjusting the width and/or transparency of the line segments.

In the previously described exemplary annotation display techniques, the page texture is not directly modified when the user specifies an annotation because the page texture may be public data shared by multiple users. As such, the page texture is not directly modified, because it is desired to preserve the original content of the page. Annotations, on the other hand, are more likely to be private data created by one user. By preserving the original page texture, and associating annotation data with the page texture when the page is displayed, the annotations may be easily removed when necessary. As such, the annotation data is stored separately from the corresponding page texture to allow flexibility in accessing the un-annotated three-dimensional document, the annotations alone, or the annotated three-dimensional document. However, the page texture data could be modified and/or updated permanently with annotation data.

Figure 13:
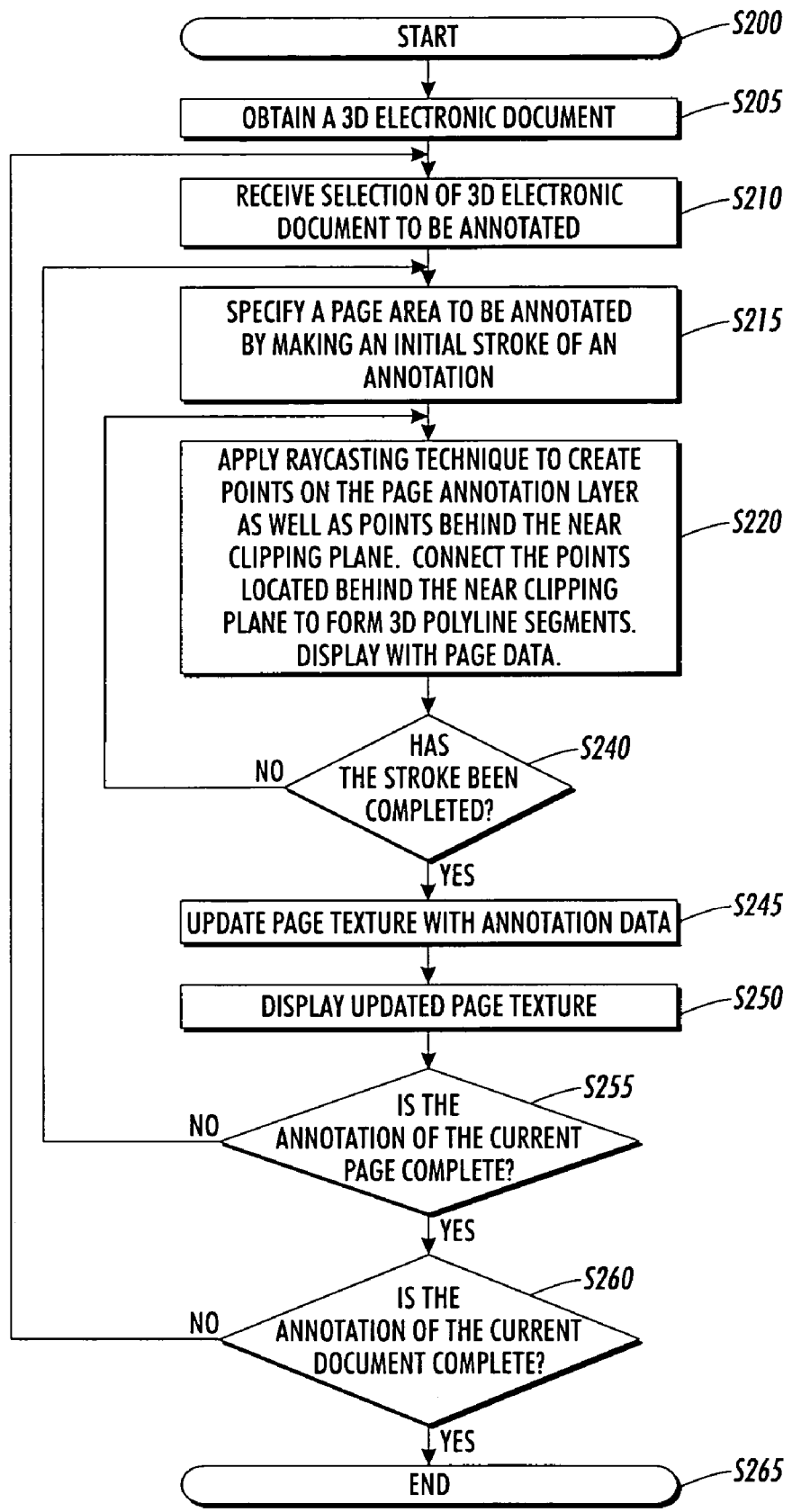
FIG. 13 illustrates a flowchart outlining an exemplary embodiment of a method for annotating pages of three-dimensional electronic documents using a hybrid technique.

FIG. 13 is a flow chart illustrating an outline of an exemplary embodiment of a method for annotating three-dimensional documents using a hybrid technique. As shown in FIG. 13, operation of the method begins in step S200, and continues to step S205, where a three-dimensional document is obtained. Then, in step S210, a page of a three-dimensional document to be annotated is turned to and displayed. It should be appreciated that a user may use a drop-down menu, a mouse button, keyboard, and/or other input device to select a page to be turned to.

Next, in step S215, a page area of the three-dimensional page to be annotated is specified by a user as the user makes an initial stroke of the annotation.

Then, in step S220, a raycasting technique is applied to create points on the page annotation layer as well as points corresponding to the annotation behind the near clipping plane of the camera frustum as the stroke is created. The points located behind the near clipping plane are connected to form 3D polyline segments. The 3D polyline segments are displayed over the page. The annotation data relating to the specified page area is correlated with the page by mapping the boundaries of the annotation data from the screen coordinate system to the local coordinate system of the page and the texture coordinate system. The correlated annotation data is then stored with other data (e.g., the page texture) of the page to be annotated.

Next, in step S240, a decision is made as to whether the stroke has been completed. If so, the operation continues to step S245. Otherwise, the operation returns to step S220, and steps S220 through S240 are repeated until the stroke has been completed.

After a stroke has been completed, the operation continues to step S245 where the page texture is updated with the annotation data created in step 220. The 3D polyline segments formed on the 3D polyline layer may be removed.

Next, in step S250, the updated page texture is displayed. Thus, after a stroke of an annotation has been completed and the page texture updated, the updated page texture is displayed. As such, subsequent annotations can be displayed as 3D polyline segments, while the previous annotation data is displayed with the page texture.

Next in step S255, it is determined whether the annotation of the current page is completed. If so, operation continues to step S260. If not, operation returns to step S215.

In step S260, it is determined whether the annotation of the current document is completed. If so, operation continues to step S265, where the operation ends. If not, operation returns to step S210.

Figure 14:
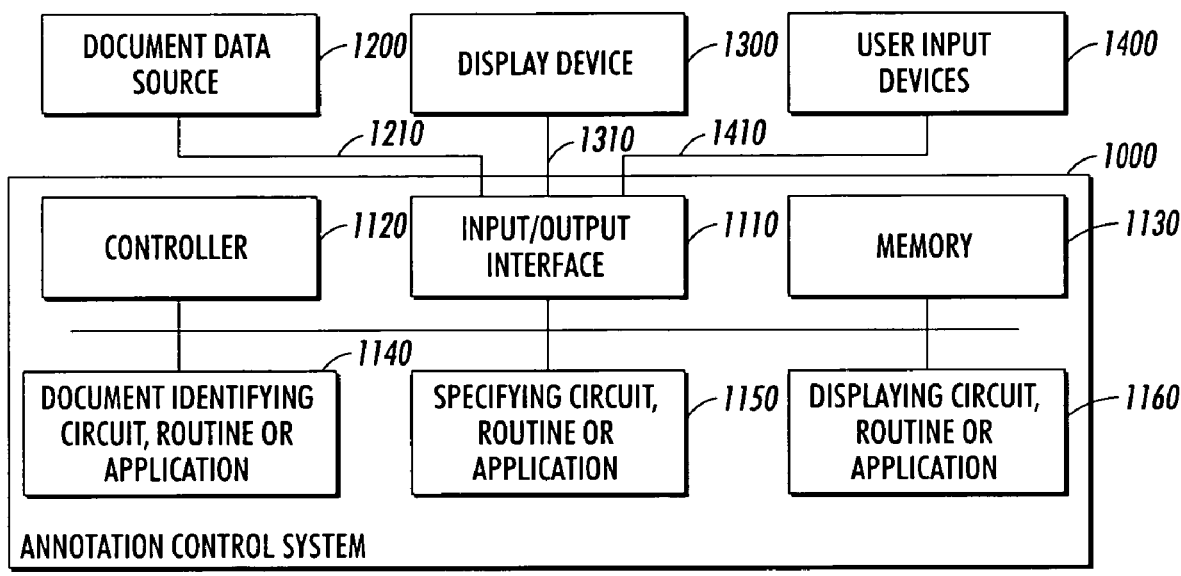
FIG. 14 is a block diagram outlining one exemplary embodiment of a system for annotating pages of three-dimensional electronic documents.

FIG. 14 is a functional block diagram outlining an exemplary embodiment of an annotation control system 1000 according to this invention. As shown in FIG. 14, the annotation control system 1000 includes an input/output interface 1110, a controller 1120, a memory 1130, a document identifying circuit, routine or application 1140, a page area specifying circuit, routine or application 1150, and an annotation displaying circuit, routine or application 1160, each appropriately interconnected by one or more control and/or data buses. The input/output interface 1110 is linked to a document data source 1200 by a link 1210, and to a display device 1300 by a link 1310. Further, the input/output interface 1110 is linked to one or more user input devices 1400 by one or more links 1410.

Each of the links 1210, 1310 and 1410 can be any known or later-developed connection system or structure usable to connect their respective devices to the annotation control system 1000. It should also be understood that links 1210, 1310 and 1410 do not need to be of the same type.

The memory 1130, which is a computer readable storage medium, can be implemented using any appropriate combination of alterable, volatile or non-volatile memory or non-alterable, or fixed, memory. The alterable memory, whether volatile or non-volatile, can be implemented by using any one or more of static or dynamic RAM, a floppy disk and disk drive, a writable or rewritable optical disk and disk drive, a hard drive, flash memory or the like. Similarly, the non-alterable or fixed memory can be implemented using any one or more of ROM, PROM, EPROM, EEPROM, and gaps in optical ROM disk, such as a CD ROM or DVD ROM disk and disk drive, or the like.

The input/output interface 1110 is connected to the user input devices 1400 over a link 1410. The user input devices 1400 can be one or more of a touch pad, a touch screen, a track ball, a mouse, a keyboard, a stylus, an electronic pen or any known or later-developed user input devices 1400 for inputting data and/or control signals to the annotation control system for annotating pages of the three-dimensional electronic document.

Furthermore, the input/output interface 1110 is connected to display device 1300 over link 1310. In general, the display device 1300 can be any device that is capable of outputting, i.e. displaying, a rendered image of the three-dimensional electronic document.

The document identifying circuit, routine or application 1140 receive a user input, inputs a three-dimensional electronic document to be annotated and identifies the three-dimensional document page to be annotated. Then, the page area specifying circuit, routine or application 1150 receives a user input, inputs the three-dimensional electronic document, inputs the identified three-dimension page to be annotated and specifies a portion of the page as the page area to be annotated. Finally, the annotation displaying circuit, routine or application 1160 inputs the three-dimensional electronic document, inputs the identified three-dimension page to be annotated, inputs the specified page area to be annotated, and displays the annotated page using an annotation display technique.

An exemplary embodiment of an annotation control system 1000 for annotating pages of a three-dimensional electronic document according to FIGS. 6 and 13 operates in the following manner.

In operation, a user input is output from the user input devices 1400 over link 1410 to the input/output data interface 1110 of the annotation control system 1000. The user input information is then stored in the memory 1130 under control of the controller 1120. Next, the three-dimensional documents is output from the document data source 1200 over link 1210 to the input/output interface 1110 in accordance with the user input. The three-dimensional electronic document is then input into the document identifying circuit, routine or application 1140 under the control of the controller 1120.

The document identifying circuit, routine or application 1140 identifies the three-dimensional electronic document to be annotated based on user input and the controller stores the identified three-dimensional electronic document in the memory 1130.

The page area specifying circuit, routine or application 1150 allows the user to specify a portion of the three-dimensional document area to be annotated on the display device 1300. Additionally, the page area specifying circuit, routine or application 1150 maps the boundary of the page area from the screen coordinate system to the local coordinate system of the page. The page area specifying circuit, routine or application 1150 also maps the boundary of the page area from the local coordinate system of the page to the texture coordinate system of the page when required (e.g., when the vertex coloring technique, texture coloring display technique, or hybrid technique is used to display the annotation). Further, the page area specifying circuit, routine or application 1150 may modify color or ink density of the annotation instrument based on user input. Finally, the page area specifying circuit, routine or application 1150 stores the annotation data in memory 1130 and correlates the annotation data with other data of the page via the controller 1120.

The annotation displaying circuit, routine or application 1160 displays the annotation in the specified page area according to the display technique selected by the user. Then, the annotation displaying circuit, routine or application 1160 superimposes 3D polyline segments or a transparent polygon over the page area to be annotated. Alternatively and/or subsequently, the annotation displaying circuit, routine or application 1160 re-evaluates and colors the vertices within the page area to be annotated or modifies texture pixels within the page area to be annotated based on the selected display technique.

In exemplary embodiments of the systems and methods for annotating three-dimensional electronic documents, it should be appreciated that the systems and methods can be applied to a flat page surface and/or a curved page surface. However, when the systems and methods are applied to a curved page surface, the annotation is also required to deform along with the page area to be annotated.

While this invention has been described in conjunction with the exemplary embodiments outlined above. These embodiments are intended to be illustrative, not limiting. Various changes, substitutes, improvements or the like may be made without departing from the spirit and scope of the invention.

What is claimed is:

1. A method for annotating a three-dimensional page of a three-dimensional electronic document, comprising:
   displaying the three-dimensional page, the three-dimensional page having a first layer intrinsic therewith;
   receiving, via an annotation tool, an indication of an area of the object to be annotated;
   annotating a second layer, the second layer intrinsic with the three-dimensional page by marking the area of the three-dimensional page specified by the annotation tool, the second layer being represented by a three-dimensional geometry; and
   displaying an annotation corresponding to the specified area, wherein the annotation of the second layer is transformed to and displayed in a third layer other than the second layer and the first layer, the third layer being represented in a two-dimensional coordinate system of the three-dimensional page.

2. The method of claim 1, wherein providing the annotation tool includes supporting at least one of a free-form annotation and a text annotation.

3. The method of claim 1, wherein providing the annotation tool includes providing a virtual highlighter having a highlight color and an ink density to annotate the selected three-dimensional page.

4. The method of claim 1, wherein specifying the area of the three-dimensional page to be annotated includes:
   determining coordinates of the specified area on a two-dimensional screen in a screen coordinate system; and
   mapping the coordinates of the specified area from the screen coordinate system to the third layer, and at least one of the first layer and the second layer.

5. The method of claim 1, wherein displaying the annotation data comprises placing the third layer over the first layer.

6. The method of claim 1, wherein a first part of the annotation is represented by the texture coloring annotation technique, and a second part of the annotation is represented by a technique other than the texture coloring technique.

7. The method of claim 1, wherein displaying the annotation data includes displaying the annotation data with a transparent geometric shape technique.

8. The method of claim 1, wherein the first layer represents the geometry of the three-dimensional page, the geometry of the three-dimensional page having a polygon mesh, the polygon mesh having vertices and edges connecting the vertices.

9. The method of claim 8, wherein each of the vertices includes a texture coordinate in a texture coordinate system of the three-dimensional page.

10. The method of claim 9, wherein the annotation data is displayed using the texture coloring technique and the texture coloring technique includes modifying the color of the texture pixels in the specified area to be annotated.

11. The method of claim 10, wherein modifying the texture pixels within the specified area to be annotated includes blending the color of the texture pixels and a color of the annotation tool.

12. The method of claim 1, wherein a user annotates the second layer by applying a single stroke to the specified area of the three-dimensional page.

13. The method of claim 12, wherein the annotation data is displayed during the stroke by placing the third layer over the first layer; and the annotation data is displayed after the stroke by updating the first layer with the annotation data and displaying the first layer.

14. The method of claim 12, wherein the stroke is a single uninterrupted annotation event.

15. The method of claim 12, wherein the stroke comprises multiple annotation events.

16. The method of claim 1, wherein the annotation is first displayed in the third layer and, subsequently, the annotation is removed from the third layer and displayed in the first layer.

17. The method of claim 16, wherein the annotation is removed from the third layer and displayed in the first layer by updating the first layer with the texture coloring annotation technique.

18. A computer readable storage medium on which is recorded a set of instructions to be performed when executed by a computer, the instructions comprising:

an instruction for displaying the three-dimensional page, the three-dimensional page having a first layer intrinsic therewith;

an instruction for receiving, via an annotation tool, an indication of an area of the object to be annotated;

an instruction for annotating a second layer, the second layer intrinsic with the three-dimensional page by marking the area of the three-dimensional page specified by the annotation tool, the second layer being represented by a three-dimensional geometry; and an instruction for displaying an annotation corresponding to the specified area, wherein the annotation of the second layer is transformed to and displayed in a third layer other than the second layer and the first layer, the third layer being represented in a two-dimensional coordinate system of the three-dimensional page.

19. An apparatus for annotating an electronic object, comprising:

a display;

an annotation tool;

a computer readable storage medium including:

an instruction for displaying by the display the three-dimensional page, the three-dimensional page having a first layer intrinsic therewith;

an instruction for receiving, via an annotation tool, an indication of an area of the object to be annotated;

an instruction for annotating a second layer, the second layer intrinsic with the three-dimensional page by marking the area of the three-dimensional page specified by the annotation tool, the second layer being represented by a three-dimensional geometry; and an instruction for displaying an annotation corresponding to the specified area, wherein the annotation of the second layer is transformed to and displayed in a third layer other than the second layer and the first layer, the third layer being represented in a two-dimensional coordinate system of the three-dimensional page; and a controller that executes the instructions.

20. The method of claim 1, wherein the annotation displayed in the third layer is displayed in a layer formed behind a near clipping plane of a virtual camera frustum.

\* \* \* \* \*